(12) United States Patent
Scoggins et al.

(10) Patent No.: US 7,176,807 B2
(45) Date of Patent: Feb. 13, 2007

(54) SYSTEM FOR AUTOMATICALLY ENFORCING A DEMAND RESET IN A FIXED NETWORK OF ELECTRICITY METERS

(75) Inventors: Sean M. Scoggins, Raleigh, NC (US); Stuart Mills, Knightdale, NC (US); Robert T. Mason, Raleigh, NC (US); Andrew J. Borleske, Garner, NC (US); Kathryn J. Smith, Raleigh, NC (US); Dileep Rudran, Cary, NC (US)

(73) Assignee: Elster Electricity, LLC, Raleigh, NC (US)

( * ) Notice: Subject to any disclaimer, the term of this patent is extended or adjusted under 35 U.S.C. 154(b) by 0 days.

(21) Appl. No.: 10/948,929

(22) Filed: Sep. 24, 2004

(65) Prior Publication Data

US 2006/0071810 A1    Apr. 6, 2006

(51) Int. Cl.
*G08C 15/06*    (2006.01)
*G08B 23/00*    (2006.01)
(52) U.S. Cl. .................................. 340/870.02; 702/61
(58) Field of Classification Search .......... 340/870.02, 340/870.03, 2.1, 2.23; 702/61
See application file for complete search history.

(56) References Cited

U.S. PATENT DOCUMENTS

| | | | |
|---|---|---|---|
| 3,445,815 A | 5/1969 | Saltzberg et al. ........... 340/163 |
| 3,858,212 A | 12/1974 | Tompkins et al. .... 343/100 CS |
| 3,878,512 A | 4/1975 | Kobayashi et al. ..... 340/168 R |
| 3,973,240 A | 8/1976 | Fong ......................... 340/151 |
| 4,031,513 A | 6/1977 | Simciak ................. 340/152 T |
| 4,056,107 A | 11/1977 | Todd et al. .................... 130/27 |
| 4,066,964 A | 1/1978 | Costanza et al. ............. 325/55 |
| 4,132,981 A | 1/1979 | White ....................... 340/203 |
| 4,190,800 A | 2/1980 | Kelly, Jr. et al. ............ 325/37 |
| 4,204,195 A | 5/1980 | Bogacki ..................... 340/151 |
| 4,218,737 A | 8/1980 | Buscher et al. ............ 364/493 |
| 4,250,489 A | 2/1981 | Dudash et al. ............. 340/147 |
| 4,254,472 A | 3/1981 | Juengel et al. ............. 364/900 |
| 4,319,358 A | 3/1982 | Sepp ........................... 375/1 |

(Continued)

FOREIGN PATENT DOCUMENTS

CH    682196 A5    7/1993

(Continued)

OTHER PUBLICATIONS

Desbonnet, Joe et al., "System Architecture and Implementation of CEBus/Internet Gateway", *IEEE*, 1997, 1057-1062.

(Continued)

*Primary Examiner*—Timothy Edwards, Jr.
(74) *Attorney, Agent, or Firm*—Woodcock Washburn LLP

(57) ABSTRACT

Methods and systems of enforcing a demand reset in a meter that communicates via a wireless network. When billing data is received by a server, it is accompanied by a demand reset counter. The counter is compared to a counter stored on the server. If they received counter is less than the server counter, it is determined that the meter missed a demand reset. The server then instructs the meter to perform a billing read and to perform a demand reset to ensure that accurate demand data is received by the server.

17 Claims, 3 Drawing Sheets

U.S. PATENT DOCUMENTS

| | | | |
|---|---|---|---|
| 4,321,582 A | 3/1982 | Banghart | 340/310 |
| 4,322,842 A | 3/1982 | Martinez | 370/204 |
| 4,328,581 A | 5/1982 | Harmon et al. | 371/8 |
| 4,361,851 A | 11/1982 | Asip et al. | 358/84 |
| 4,361,890 A | 11/1982 | Green, Jr. et al. | 375/1 |
| 4,396,915 A | 8/1983 | Farnsworth et al. | 340/870.03 |
| 4,405,829 A | 9/1983 | Rivest et al. | 178/22.14 |
| 4,415,896 A | 11/1983 | Allgood | 340/870.03 |
| 4,466,001 A | 8/1984 | Moore et al. | 340/825.08 |
| 4,504,831 A | 3/1985 | Jahr et al. | 340/870.03 |
| 4,506,386 A | 3/1985 | Ichikawa et al. | 455/343 |
| 4,513,415 A | 4/1985 | Martinez | 370/92 |
| 4,525,861 A | 6/1985 | Freeburg | 455/33 |
| 4,600,923 A | 7/1986 | Hicks et al. | 340/870.03 |
| 4,608,699 A | 8/1986 | Batlivala et al. | 375/216 |
| 4,611,333 A | 9/1986 | McCallister et al. | 375/1 |
| 4,614,945 A | 9/1986 | Brunius et al. | 340/870.03 |
| 4,617,566 A | 10/1986 | Diamond | 340/870.11 |
| 4,628,313 A | 12/1986 | Gombrich et al. | 340/870.02 |
| 4,631,538 A | 12/1986 | Carreno | 340/870.18 |
| 4,638,298 A | 1/1987 | Spiro | 340/827 |
| 4,644,321 A | 2/1987 | Kennon | 340/310 |
| 4,653,076 A | 3/1987 | Jerrim et al. | 375/115 |
| 4,672,555 A | 6/1987 | Hart et al. | 700/276 |
| 4,680,704 A | 7/1987 | Konicek et al. | 364/525 |
| 4,688,038 A | 8/1987 | Giammarese | 340/870.02 |
| 4,692,761 A | 9/1987 | Robinton | 340/825 |
| 4,707,852 A | 11/1987 | Jahr et al. | 379/107 |
| 4,713,837 A | 12/1987 | Gordon | 379/93 |
| 4,724,435 A | 2/1988 | Moses et al. | 340/870.13 |
| 4,728,950 A | 3/1988 | Hendrickson et al. | 340/870.31 |
| 4,734,680 A | 3/1988 | Gehman et al. | 340/539 |
| 4,749,992 A | 6/1988 | Fitzmeyer et al. | 340/870.02 |
| 4,757,456 A | 7/1988 | Benghiat | 364/464 |
| 4,769,772 A | 9/1988 | Dwyer | 364/300 |
| 4,783,748 A | 11/1988 | Swartztrauber et al. | 364/483 |
| 4,792,946 A | 12/1988 | Mayo | 370/338 |
| 4,799,059 A | 1/1989 | Grindahl et al. | 340/870.03 |
| 4,804,938 A | 2/1989 | Rouse et al. | 340/310 |
| 4,811,011 A | 3/1989 | Sollinger | 340/870.02 |
| 4,827,514 A | 5/1989 | Ziolko et al. | 380/48 |
| 4,833,618 A | 5/1989 | Verma et al. | 364/483 |
| 4,839,645 A | 6/1989 | Lill | 340/870.17 |
| 4,841,545 A | 6/1989 | Endo et al. | 375/1 |
| 4,860,379 A | 8/1989 | Schoeneberger et al. | 455/5 |
| 4,862,493 A | 8/1989 | Venkataraman et al. | 379/107 |
| 4,868,877 A | 9/1989 | Fischer | 380/25 |
| 4,884,021 A | 11/1989 | Hammond et al. | 324/142 |
| 4,912,722 A | 3/1990 | Carlin | 375/1 |
| 4,922,518 A | 5/1990 | Gordon et al. | 379/57 |
| 4,939,726 A | 7/1990 | Flammer et al. | 370/94.1 |
| 4,940,974 A | 7/1990 | Sojka | 340/825.08 |
| 4,940,976 A | 7/1990 | Gastouniotis et al. | 340/870.02 |
| 4,958,359 A | 9/1990 | Kato | 375/1 |
| 4,964,138 A | 10/1990 | Nease et al. | 375/1 |
| 4,965,533 A | 10/1990 | Gilmore | 331/18 |
| 4,972,507 A | 11/1990 | Lusignan | 455/51 |
| 5,007,052 A | 4/1991 | Flammer | 370/85.6 |
| 5,018,165 A | 5/1991 | Sohner et al. | 375/1 |
| 5,022,046 A | 6/1991 | Morrow, Jr. | 375/1 |
| 5,032,833 A | 7/1991 | Laporte | 340/825.02 |
| 5,053,766 A | 10/1991 | Ruiz-del-Portal et al. | 340/870.02 |
| 5,053,774 A | 10/1991 | Schuermann et al. | 342/44 |
| 5,056,107 A | 10/1991 | Johnson et al. | 375/1 |
| 5,067,136 A | 11/1991 | Arthur et al. | 375/1 |
| 5,079,715 A | 1/1992 | Venkataraman et al. | 364/481 |
| 5,079,768 A | 1/1992 | Flammer | 370/94.1 |
| 5,086,292 A | 2/1992 | Johnson et al. | 340/637 |
| 5,086,385 A | 2/1992 | Launey | 364/188 |
| 5,090,024 A | 2/1992 | Vander Mey et al. | 375/1 |
| 5,111,479 A | 5/1992 | Akazawa | 375/1 |
| 5,115,433 A | 5/1992 | Baran et al. | 370/94.3 |
| 5,115,448 A | 5/1992 | Mori | 375/1 |
| 5,129,096 A | 7/1992 | Burns | 455/18 |
| 5,130,987 A | 7/1992 | Flammer | 370/103 |
| 5,132,985 A | 7/1992 | Hashimoto et al. | 375/1 |
| 5,136,614 A | 8/1992 | Hiramatsu et al. | 375/1 |
| 5,142,694 A | 8/1992 | Jackson et al. | 455/67.1 |
| 5,151,866 A | 9/1992 | Glaser et al. | 364/483 |
| 5,155,481 A | 10/1992 | Brennan, Jr. et al. | 340/870.02 |
| 5,160,926 A | 11/1992 | Schweitzer, III | 340/870.02 |
| 5,166,664 A | 11/1992 | Fish | 340/539 |
| 5,177,767 A | 1/1993 | Kato | 375/1 |
| 5,179,376 A | 1/1993 | Pomatto | 340/870.02 |
| 5,189,694 A | 2/1993 | Garland | 379/106 |
| 5,194,860 A | 3/1993 | Jones et al. | 340/870.02 |
| 5,197,095 A | 3/1993 | Bonnett | 379/107 |
| 5,204,877 A | 4/1993 | Endo et al. | 375/1 |
| 5,214,587 A | 5/1993 | Green | 364/464.04 |
| 5,225,994 A | 7/1993 | Arinobu et al. | 364/492 |
| 5,228,029 A | 7/1993 | Kotzin | 370/95.1 |
| 5,229,996 A | 7/1993 | Bäckström et al. | 370/100.1 |
| 5,239,575 A | 8/1993 | White et al. | 379/107 |
| 5,239,584 A | 8/1993 | Hershey et al. | 380/28 |
| 5,243,338 A | 9/1993 | Brennan, Jr. et al. | 340/870.02 |
| 5,252,967 A | 10/1993 | Brennan et al. | 340/870.02 |
| 5,260,943 A | 11/1993 | Comroe et al. | 370/95.1 |
| 5,270,704 A | 12/1993 | Sosa Quintana et al. | 340/870.02 |
| 5,280,498 A | 1/1994 | Tymes et al. | 375/1 |
| 5,280,499 A | 1/1994 | Suzuki | 375/1 |
| 5,285,469 A | 2/1994 | Vanderpool | 375/1 |
| 5,287,287 A | 2/1994 | Chamberlain et al. | 364/483 |
| 5,289,497 A | 2/1994 | Jacobson et al. | 375/1 |
| 5,295,154 A | 3/1994 | Meier et al. | 375/1 |
| 5,307,349 A | 4/1994 | Shloss et al. | 370/85.2 |
| 5,311,541 A | 5/1994 | Sanderford, Jr. | 375/1 |
| 5,311,542 A | 5/1994 | Eder | 375/1 |
| 5,315,531 A | 5/1994 | Oravetz et al. | 364/550 |
| 5,319,679 A | 6/1994 | Bagby | 375/106 |
| 5,329,547 A | 7/1994 | Ling | 375/1 |
| 5,345,225 A | 9/1994 | Davis | 340/635 |
| 5,359,625 A | 10/1994 | Vander Mey et al. | 375/1 |
| 5,377,222 A | 12/1994 | Sanderford, Jr. | 375/1 |
| 5,381,462 A | 1/1995 | Larson et al. | 379/107 |
| 5,383,134 A | 1/1995 | Wrzesinski | 364/514 |
| 5,384,712 A | 1/1995 | Oravetz et al. | 364/550 |
| 5,387,873 A | 2/1995 | Muller et al. | 327/155 |
| 5,390,360 A | 2/1995 | Scop et al. | 455/34.2 |
| 5,406,495 A | 4/1995 | Hill | 364/483 |
| 5,416,917 A | 5/1995 | Adair et al. | 395/500 |
| 5,420,799 A | 5/1995 | Peterson et al. | 364/483 |
| 5,428,636 A | 6/1995 | Meier | 375/202 |
| 5,430,759 A | 7/1995 | Yokev et al. | 375/202 |
| 5,432,507 A | 7/1995 | Mussino et al. | 340/870.03 |
| 5,432,815 A | 7/1995 | Kang et al. | 375/200 |
| 5,438,329 A | 8/1995 | Gastouniotis et al. | 340/870.02 |
| 5,448,230 A | 9/1995 | Schanker et al. | 340/870.03 |
| 5,448,570 A | 9/1995 | Toda et al. | 370/95.3 |
| 5,450,088 A | 9/1995 | Meier et al. | 342/51 |
| 5,452,465 A | 9/1995 | Geller et al. | 395/800 |
| 5,455,533 A | 10/1995 | Köllner | 327/484 |
| 5,455,544 A | 10/1995 | Kechkaylo | 332/103 |
| 5,455,569 A | 10/1995 | Sherman et al. | 340/825.02 |
| 5,455,822 A | 10/1995 | Dixon et al. | 370/18 |
| 5,457,713 A | 10/1995 | Sanderford, Jr. et al. | 375/206 |
| 5,461,558 A | 10/1995 | Patsiokas et al. | 364/145 |
| 5,463,657 A | 10/1995 | Rice | 375/200 |
| 5,473,322 A | 12/1995 | Carney | 340/870.02 |
| 5,475,742 A | 12/1995 | Gilbert | 379/106 |
| 5,475,867 A | 12/1995 | Blum | 455/53.1 |
| 5,479,442 A | 12/1995 | Yamamoto | 375/206 |
| 5,481,259 A | 1/1996 | Bane | 340/870.03 |

| Patent No. | Date | Inventor | Class |
|---|---|---|---|
| 5,488,608 A | 1/1996 | Flammer, III | 370/85.13 |
| 5,491,473 A | 2/1996 | Gilbert | 340/870.01 |
| 5,493,287 A | 2/1996 | Bane | 340/825.52 |
| 5,495,239 A | 2/1996 | Ouellette | 340/870.02 |
| 5,497,424 A | 3/1996 | Vanderpool | 380/34 |
| 5,499,243 A | 3/1996 | Hall | 370/85.8 |
| 5,500,871 A | 3/1996 | Kato et al. | 375/208 |
| 5,511,188 A | 4/1996 | Pascucci et al. | 395/600 |
| 5,519,388 A | 5/1996 | Adair, Jr. | 340/870.02 |
| 5,521,910 A | 5/1996 | Matthews | 370/54 |
| 5,522,044 A | 5/1996 | Pascucci et al. | 395/200.06 |
| 5,524,280 A | 6/1996 | Douthitt et al. | 455/62 |
| 5,525,898 A | 6/1996 | Lee, Jr. et al. | 324/142 |
| 5,526,389 A | 6/1996 | Buell et al. | 375/200 |
| 5,528,507 A | 6/1996 | McNamara et al. | 364/483 |
| 5,528,597 A | 6/1996 | Gerszberg et al. | 370/95.3 |
| 5,539,775 A | 7/1996 | Tuttle et al. | 375/200 |
| 5,541,589 A | 7/1996 | Delaney | 340/870.02 |
| 5,544,036 A | 8/1996 | Brown, Jr. et al. | 364/145 |
| 5,546,424 A | 8/1996 | Miyake | 375/206 |
| 5,548,527 A | 8/1996 | Hemminger et al. | 364/492 |
| 5,548,633 A | 8/1996 | Kujawa et al. | 379/93 |
| 5,553,094 A | 9/1996 | Johnson et al. | 375/200 |
| 5,555,508 A | 9/1996 | Munday et al. | 364/492 |
| 5,559,870 A | 9/1996 | Patton et al. | 379/107 |
| 5,566,332 A | 10/1996 | Adair et al. | 395/600 |
| 5,570,084 A | 10/1996 | Ritter et al. | 340/825.05 |
| 5,572,438 A | 11/1996 | Ehlers et al. | 364/492 |
| 5,574,657 A | 11/1996 | Tofte | 364/510 |
| 5,590,179 A | 12/1996 | Shincovich et al. | 379/107 |
| 5,592,470 A | 1/1997 | Rudrapatna et al. | 370/320 |
| 5,594,740 A | 1/1997 | LaDue | 379/59 |
| 5,602,744 A | 2/1997 | Meek et al. | 364/464.22 |
| 5,617,084 A | 4/1997 | Sears | 331/176 |
| 5,619,192 A | 4/1997 | Ayala | 340/870.02 |
| 5,619,685 A | 4/1997 | Schiavone | 395/500 |
| 5,621,629 A | 4/1997 | Hemminer et al. | 363/56 |
| 5,627,759 A | 5/1997 | Bearden et al. | 364/483 |
| 5,631,636 A | 5/1997 | Bane | 340/825.69 |
| 5,636,216 A | 6/1997 | Fox et al. | 370/402 |
| 5,640,679 A | 6/1997 | Lundqvist et al. | 455/33.2 |
| 5,659,300 A | 8/1997 | Dresselhuys et al. | 340/870.02 |
| 5,668,803 A | 9/1997 | Tymes et al. | 370/312 |
| 5,668,828 A | 9/1997 | Sanderford, Jr. et al. | 375/202 |
| 5,673,252 A | 9/1997 | Johnson et al. | 370/449 |
| 5,684,472 A | 11/1997 | Bane | 340/870.02 |
| 5,684,799 A | 11/1997 | Bigham et al. | 370/397 |
| 5,691,715 A | 11/1997 | Ouellette | 340/870.09 |
| 5,692,180 A | 11/1997 | Lee | 395/610 |
| 5,696,501 A | 12/1997 | Ouellette et al. | 340/870.02 |
| 5,696,765 A | 12/1997 | Safadi | 370/436 |
| 5,699,276 A | 12/1997 | Roos | 364/514 A |
| 5,714,931 A | 2/1998 | Petite et al. | 340/539 |
| 5,715,390 A | 2/1998 | Hoffman et al. | 395/188.01 |
| 5,717,604 A | 2/1998 | Wiggins | 364/514 C |
| 5,719,564 A | 2/1998 | Sears | 340/870.02 |
| 5,732,078 A | 3/1998 | Arango | 370/355 |
| 5,745,491 A | 4/1998 | Entner et al. | 707/103 |
| 5,748,104 A | 5/1998 | Argyroudis et al. | 340/870.11 |
| 5,748,619 A | 5/1998 | Meier | 370/278 |
| 5,751,914 A | 5/1998 | Coley et al. | 395/51 |
| 5,751,961 A | 5/1998 | Smyk | 395/200.47 |
| 5,754,772 A | 5/1998 | Leaf | 395/200.33 |
| 5,754,830 A | 5/1998 | Butts et al. | 395/500 |
| 5,757,783 A | 5/1998 | Eng et al. | 370/315 |
| 5,768,148 A | 6/1998 | Murphy et al. | 364/492 |
| 5,778,368 A | 7/1998 | Hogan et al. | 707/10 |
| 5,787,437 A | 7/1998 | Potterveld et al. | 707/103 |
| 5,790,789 A | 8/1998 | Suarez | 395/200.32 |
| 5,790,809 A | 8/1998 | Holmes | 395/200.58 |
| 5,801,643 A | 9/1998 | Williams et al. | 340/870.02 |
| 5,805,712 A | 9/1998 | Davis | 380/50 |
| 5,808,558 A | 9/1998 | Meek et al. | 340/870.01 |
| 5,809,059 A | 9/1998 | Souissi et al. | 375/202 |
| 5,822,521 A | 10/1998 | Gartner et al. | 395/200.6 |
| 5,850,187 A | 12/1998 | Carrender et al. | 340/10.42 |
| 5,862,391 A | 1/1999 | Salas et al. | 395/750.01 |
| 5,872,774 A | 2/1999 | Wheatley, III et al. | 370/335 |
| 5,874,903 A | 2/1999 | Shuey et al. | 340/870.02 |
| 5,875,183 A | 2/1999 | Nitadori | 370/328 |
| 5,875,402 A | 2/1999 | Yamawaki | 455/502 |
| 5,884,184 A | 3/1999 | Sheffer | 455/521 |
| 5,892,758 A | 4/1999 | Argyroudis | 370/335 |
| 5,896,382 A | 4/1999 | Davis et al. | 370/401 |
| 5,897,607 A | 4/1999 | Jenney et al. | 702/62 |
| 5,898,387 A | 4/1999 | Davis et al. | 340/870.02 |
| 5,907,491 A | 5/1999 | Canada et al. | 364/468.15 |
| 5,907,540 A | 5/1999 | Hayashi | 370/315 |
| 5,910,799 A | 6/1999 | Carpenter et al. | 345/333 |
| 5,923,269 A | 7/1999 | Shuey et al. | 340/870.02 |
| 5,926,103 A | 7/1999 | Petite | 340/825.19 |
| 5,926,531 A | 7/1999 | Petite | 379/144 |
| 5,943,375 A | 8/1999 | Veintimilla | 375/355 |
| 5,944,842 A | 8/1999 | Propp et al. | 714/701 |
| 5,953,319 A | 9/1999 | Dutta et al. | 370/238 |
| 5,959,550 A | 9/1999 | Giles | 340/870.02 |
| 5,960,074 A | 9/1999 | Clark | 379/310 |
| 5,963,146 A | 10/1999 | Johnson et al. | 340/870.1 |
| 5,974,236 A | 10/1999 | Sherman | 395/200.51 |
| 5,986,574 A | 11/1999 | Colton | 340/870.02 |
| 6,000,034 A | 12/1999 | Lightbody et al. | 713/202 |
| 6,028,522 A | 2/2000 | Petite | 340/641 |
| 6,034,988 A | 3/2000 | VanderMey et al. | 375/202 |
| 6,035,201 A | 3/2000 | Whitehead | 455/455 |
| 6,041,056 A | 3/2000 | Bigham et al. | 370/395 |
| 6,061,604 A | 5/2000 | Russ et al. | 700/90 |
| 6,067,029 A | 5/2000 | Durston | 340/870.03 |
| 6,073,169 A | 6/2000 | Shuey et al. | 709/217 |
| 6,073,174 A | 6/2000 | Montgomerie et al. | 709/224 |
| 6,078,251 A | 6/2000 | Landt et al. | 340/10.41 |
| 6,078,785 A | 6/2000 | Bush | 455/7 |
| 6,078,909 A | 6/2000 | Knutson | 705/59 |
| 6,088,659 A | 7/2000 | Kelley et al. | 702/62 |
| 6,091,758 A | 7/2000 | Ciccone et al. | 375/132 |
| 6,100,817 A | 8/2000 | Mason, Jr. et al. | 340/870.02 |
| 6,112,192 A | 8/2000 | Capek | 705/59 |
| 6,124,806 A | 9/2000 | Cunningham et al. | 340/870.02 |
| 6,128,276 A | 10/2000 | Agee | 370/288 |
| 6,137,423 A | 10/2000 | Glorioso et al. | 340/870.02 |
| 6,150,955 A | 11/2000 | Tracy et al. | 340/870.02 |
| 6,154,487 A | 11/2000 | Murai et al. | 375/150 |
| 6,160,993 A | 12/2000 | Wilson | 455/12.1 |
| 6,172,616 B1 | 1/2001 | Johnson et al. | 340/870.12 |
| 6,195,018 B1 | 2/2001 | Ragle et al. | 340/870.01 |
| 6,199,068 B1 | 3/2001 | Carpenter | 707/100 |
| 6,208,266 B1 | 3/2001 | Lyons et al. | 340/870.02 |
| 6,218,953 B1 | 4/2001 | Petite | 340/641 |
| 6,233,327 B1 | 5/2001 | Petite | 379/155 |
| 6,246,677 B1 | 6/2001 | Nap et al. | 370/346 |
| 6,249,516 B1 | 6/2001 | Brownrigg et al. | 370/338 |
| 6,363,057 B1 | 3/2002 | Ardalan et al. | 370/252 |
| 6,393,341 B1 | 5/2002 | Lawrence et al. | 700/286 |
| 6,396,839 B1 | 5/2002 | Ardalan et al. | 370/401 |
| 6,421,731 B1 | 7/2002 | Ciotti, Jr. et al. | 709/238 |
| 6,430,268 B1 | 8/2002 | Petite | 379/39 |
| 6,437,692 B1 | 8/2002 | Petite et al. | 340/540 |
| 6,446,192 B1 | 9/2002 | Narasimhan et al. | 712/29 |
| 6,643,278 B1 | 11/2003 | Panasik et al. | 370/330 |
| 6,657,549 B1 | 12/2003 | Avery | 340/825.49 |
| 6,684,245 B1 | 1/2004 | Shuey et al. | 709/223 |
| 6,735,630 B1 | 5/2004 | Gelvin et al. | 709/224 |
| 6,751,563 B2 | 6/2004 | Spanier et al. | 702/61 |
| 6,801,865 B2 * | 10/2004 | Gilgenbach et al. | 702/61 |
| 2001/0002210 A1 | 5/2001 | Petite | 379/155 |
| 2001/0024163 A1 | 9/2001 | Petite | 340/628 |
| 2002/0012323 A1 | 1/2002 | Petite et al. | 370/252 |

| | | | | |
|---|---|---|---|---|
| 2002/0013679 A1 | 1/2002 | Petite | | 702/188 |
| 2002/0019712 A1 | 2/2002 | Petite et al. | | 702/61 |
| 2002/0019725 A1 | 2/2002 | Petite | | 702/188 |
| 2002/0026957 A1 | 3/2002 | Reyman | | 137/39 |
| 2002/0027504 A1 | 3/2002 | Davis et al. | | 340/540 |
| 2002/0031101 A1 | 3/2002 | Petite et al. | | 370/310 |
| 2002/0125998 A1 | 9/2002 | Petite et al. | | 340/286.01 |
| 2002/0145537 A1 | 10/2002 | Mueller et al. | | 340/870.02 |
| 2002/0169643 A1 | 11/2002 | Petite et al. | | 705/5 |
| 2003/0036810 A1 | 2/2003 | Petite | | 700/9 |
| 2003/0036822 A1 | 2/2003 | Davis et al. | | 700/295 |
| 2003/0202512 A1 | 10/2003 | Kennedy | | 370/389 |
| 2004/0113810 A1 | 6/2004 | Mason, Jr. et al. | | 340/870.02 |
| 2005/0068194 A1* | 3/2005 | Schleich et al. | | 340/870.02 |
| 2005/0240540 A1* | 10/2005 | Borleske et al. | | 705/401 |

FOREIGN PATENT DOCUMENTS

| | | |
|---|---|---|
| EP | 0 395 495 A1 | 10/1990 |
| EP | 0 446 979 A1 | 9/1991 |
| EP | 0 629 098 A2 | 12/1994 |
| GB | 2 118 340 A | 10/1983 |
| GB | 2 157 448 A | 10/1985 |
| GB | 2 186 404 A | 8/1987 |
| GB | 02 222 898 A | 3/1990 |
| GB | 2 237 910 A | 5/1991 |
| JP | 59-229949 | 12/1984 |
| JP | 02-67967 A | 3/1990 |
| JP | 4290593 A | 10/1992 |
| JP | 05-260569 | 10/1993 |
| JP | 8194023 A | 7/1996 |
| WO | 93/02515 A1 | 2/1993 |
| WO | 93/04451 A1 | 3/1993 |
| WO | 95/32595 A1 | 11/1995 |
| WO | 96/10856 A1 | 4/1996 |

OTHER PUBLICATIONS

Markwalter, Brian et al., "CEBus Network Layer Description", *IEEE*, 1989, 571-575.
Newtown, Harry, *Newton's Telecom Dictionary*, Flatiron Publishing, Inc., 10th Ed., 1996, LAN (1 of 1): Cebus Overview (1-3): Cebus Industry Council (1 of 1).
Newtown, Harry, *Newton's Telecom Dictionary*, 10th Edition, 1996, 243.
International Search Report issued in International Application No. PCT/US98/11170 Date of Mailing: Oct. 7, 1998.
International Search Report issued in International Application No. PCT/US98/19034 Date of Mailing: Feb. 1, 1999.
Internet Printout, http://www.ram.com BellSouth Wireless Data—Paging, Mobitex, Network, Business, Sep. 23, 1998:—Mobitex®: The Heart of Every BellSouth Solution—Mobitex Features and Services: RAM Mobile Data White Paper, Feb. 1997—Narrowband PCS Technologies: What are the Options?: RAM Mobile Data White Paper, Nov. 1997—The Inherent Security of Data Over Mobitex Wireless Packet Data Networks, A RAM Mobile Data White Paper, Oct. 1995—Comparative Analysis of Coverage and Performance: RAM & Ardis, 1998.
Internet Printout, http://www.ardis.com "Ardis Two-Way, Wireless Data Communications," ARDIS, Sep. 23, 1998.
Internet Printout, http://ww.ardis.com/RADIO "An Overview of Radio Coverage," Sep. 29, 1998 "Radio Propagation," Sep. 29, 1998 "Factors Affecting ARDIS Coverage," Sep. 29, 1998 "The ARDIS Network Compared to Other Systems," Sep. 29, 1998.
Internet Printout, http://www.ardis.com/RADIO "Radio Coverage," Sep. 29, 1998 "Glossary of Terms," Sep. 29, 1998 "Radio Propagation in Free Space," Sep. 29, 1998 "Real World Propagation Variations," Sep. 29, 1998 "Probability of Reception vs. Calculation," Sep. 29, 1998.
"MV-90 Read Only System" UTS Software Solutions For Utility Customers. (No Date). (No Page Numbers or Pages).
Rappaport, T. S., "Wireless Communications, Principles and Practice," Prentice Hall PTR, 1996, pp. 410-413.

Brochure: TRF6900 Single-Chip RF Transceiver, Texas Instrument, 2001®.
Corcoran, P.M. et al., "CEBus Network Access via the World-Wide-Web", *International Conference on Consumer Electronics*, Jun. 5-7, 1996, 236-237, XP-002218722.
Corcoran, P.M. et al., "Browser-Style Interfaces to a Home Automation Network", *IEEE Trans. On Consumer Electronics*, Nov. 1, 1997, 43(4), 1063-1069, XP-000768559.
Norenkov, et al., *Telecommunication Technologies and Networks*, Moscow Bauman Technical School, 1988, (Signed for publication on Dec. 10, 1997), pp. 116-118, 80-87 [1] English Language Abstract Provided.
Brownrigg, E. Ph.D., "Developing the Information Superhighway Issues for Libraries", *Library Perspectives on NREN*, The National Research and Education Network, 1990, 55-63.
Brownrigg, E.B., "The Internet as an External Economy: The Emergence of the Invisible Hand", *Library Administration and Management*, 1991, 95-97.
Frankel, M.S., "Packet Radios Provide Link for Distributed, Survivable C3 in Post-Attack Scenarios", *MSN*, Jun. 1983, 80-108.
Gower, N. et al., "Congestion Control Using Pacing in a Packet Radio Network", *IEEE Military Communications Conference*, 1982, 1, 23.1-1, 23-1-6.
Johnson, D.B., "Routing in Ad Hoc Networks of Mobile Hosts", *IEEE*, 1995, 158-163.
Jubin, J., "Current Packet Radio Networks Protocols", *IEEE Infocom Proceedings*, 1985, 86-92.
Jubin, J. et al., "The DARPA Packet Radio Network Protocols", *Proceedings of the IEEE*, 1987, 75(1), 21-32.
Kahn, R.E., "The Organization of Computer Resources into a Packet Radio Network", *IEEE Transactions on Communications*, 1977, 25(1), 169-178.
Kahn, R.E., et al., "Advances in Packet Radio Technology", *proceedings of the IEEE*, 1978, 66(11), 1468-1496.
Lauer, G. et al., "Survivable Protocols for Large Scale Packet Radio Networks",*IEEE Global Telecommunications Conference*, 1984, 468-471.
Lynch, C.A. et al., "Electronic Publishing, Electronic Imaging, and Document Delivery", *Electronic Imaging, International Electronic Imaging Exposition & Conference*, 1986, 662-667.
Lynch, C.A. et al., "The Telecommunications Landscape", 1986, 7 pages.
Lynch, C.A. et al., "Routing, Repeating, Power Control and Directional Techniques", *Packet Radio Networks*, Architectures, Protocols, Technologies and Applications, 1987, Ch 5, 105-129, 259-274.
MacGregor, W. et al., "Multiple Control Stations in Packet Radio Networks", *IEEE Military Communications Conference*, 1982, 10.3-1-10.3-5.
Shachan, N. et al., "A Packet Radio Network for Library Automation", *IEEE Military Communications Conference*, 1987, 2, 21.3. 1-21.3.7.
Shacham, N. et al., "Future Directions in Packet Radio Technology", *IEEE Infocom Proceedings*, 1985, 93-98.
Westcott, J.A., "Issues in Distributed Routing for Mobile Packet Radio Networks", *IEEE*, 1982, 233-238.
Westcott, J. et al., "A Distributed Routing Design for a Broadcast Environment", *IEEE Military Communications Conference*, 1982, 10.4-1-10.4-5.
"Packet Radio: Applications for Libraries in Developing Countries", *UDT Series on Data Communication Technologies and Standards for Libraries*, 1993, Ch 1-6, 87 pages.
Chlamtac, I. et al., "Optimizing the System of Virtual Paths", *IEEE ACM Transactions on Networking*, 1994, 2(6), 581-586.
Leung, V.C.M., "Internetworking Wireless Terminals to Local Area Networks Via Radio Bridges", *ICWC*, 1992, 126-129.
Pollini, G.P. et al., "Path Optimization Procedures for Efficient Routing of Information after an Inter-Switch Handover", *IEEE*, 1994, 1-5.
Rajogopalan, B. et al., "A New Responsive Distributed Shortest-Path Routing Algorithm", *ACM*, 1989, 237-246.

* cited by examiner

SYSTEM FOR AUTOMATICALLY ENFORCING A DEMAND RESET IN A FIXED NETWORK OF ELECTRICITY METERS

FIELD OF THE INVENTION

The present invention relates to wireless networks for collecting data, and more particularly, to systems and methods for monitoring a demand reset count in meters that are auto-read meters.

BACKGROUND OF THE INVENTION

The collection of meter data from electrical energy, water, and gas meters has traditionally been performed by human meter-readers. The meter-reader travels to the meter location, which is frequently on the customer's premises, visually inspects the meter, and records the reading. The meter-reader may be prevented from gaining access to the meter as a result of inclement weather or, where the meter is located within the customer's premises, due to an absentee customer. This methodology of meter data collection is labor intensive, prone to human error, and often results in stale and inflexible metering data.

Some meters have been enhanced to include a one-way radio transmitter for transmitting metering data to a receiving device. A person collecting meter data that is equipped with an appropriate radio receiver need only come into proximity with a meter to read the meter data and need not visually inspect the meter. Thus, a meter-reader may walk or drive by a meter location to take a meter reading. While this represents an improvement over visiting and visually inspecting each meter, it still requires human involvement in the process.

An automated means for collecting meter data involves a fixed wireless network. Devices such as, for example, repeaters and gateways are permanently affixed on rooftops and pole-tops and strategically positioned to receive data from enhanced meters fitted with radio-transmitters. Typically, these transmitters operate in the 902–928 MHz range and employ Frequency Hopping Spread Spectrum (FHSS) technology to spread the transmitted energy over a large portion of the available bandwidth.

Data is transmitted from the meters to the repeaters and gateways and ultimately communicated to a central location. While fixed wireless networks greatly reduce human involvement in the process of meter reading, such systems require the installation and maintenance of a fixed network of repeaters, gateways, and servers. Identifying an acceptable location for a repeater or server and physically placing the device in the desired location on top of a building or utility pole is a tedious and labor-intensive operation. Furthermore, each meter that is installed in the network needs to be manually configured to communicate with a particular portion of the established network. When a portion of the network fails to operate as intended, human intervention is typically required to test the effected components and reconfigure the network to return it to operation.

Thus, while existing fixed wireless systems have reduced the need for human involvement in the daily collection of meter data, such systems require substantial human investment in planning, installation, and maintenance and are relatively inflexible and difficult to manage. Therefore, there is a need for a system to manage the reading of billing data from meters to ensure that the system has the proper billing data.

SUMMARY OF THE INVENTION

The present invention is directed to methods and systems of enforcing a demand reset in a meter operating within a wireless metering network. A system in accordance with the present invention may include a network configuration server that determines a network state and a data collection server that receives meter data and a counter from the meter. When the data collection server receives the meter data and the counter, the system compares the counter to a second counter stored by the system. If the counter received from the meter is less than the second counter, the network configuration server determines that the meter has missed a demand reset and requests the meter to download the meter data and perform a demand reset.

In accordance with a feature, a first collector may be associated with a first communication path from the meter to the system. If the counter is less than the second counter, the network configuration server instructs the first collector to contact the meter, download the meter data and perform the demand reset. Also, there may be a second collector associated with a second communication path from the meter to the system. The network configuration server may determine that the meter has migrated from the second communication path to the first communication path prior to instructing the first collector to contact the meter.

According to another feature, the meter is configured as an auto-read meter and may be instructed to perform the demand reset at a time in advance of reading the meter data. Also, the meter and the system may increment the counter and the second counter for each demand reset by the meter.

In accordance with an aspect of the invention, there is provided method for enforcing a demand reset in a meter operating within a wireless metering network. The method includes receiving meter data and a counter from a meter at a data collection server; comparing the counter to a second counter; and if the counter is less than the second counter, requesting the meter to download the meter data and perform a demand reset.

The method may also include communicating the meter data to a first collector associated with a first communication path, and instructing the first collector to contact the meter to perform the billing read and the demand reset. Optionally, the method may include determining that the meter has migrated from a second communication path having a second collector; and instructing the first collector to contact the meter after determining the meter has migrated from the second path.

The method may include configuring the meter as an auto-read meter, and instructing the meter to perform the demand reset at a time in advance of reading the meter data. The meter may be instructed in accordance with a billing date. Still optionally, the method may include incrementing the counter and the second counter for each demand reset by the meter.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention.

however, the invention is not limited to the specific methods and instrumentalities disclosed. In the drawings.

DETAILED DESCRIPTION OF ILLUSTRATIVE EMBODIMENTS

Exemplary systems and methods for gathering meter data are described below with reference to FIGS. 1–3. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, are operable to wirelessly communicate with each other. A collector is operable to automatically identify and register meters for communication with the collector. When a meter is installed, the meter becomes registered with the collector that can provide a communication path to the meter. The collectors receive and compile metering data from a plurality of meter devices via wireless communications. A communications server communicates with the collectors to retrieve the compiled meter data.

Figure 1:
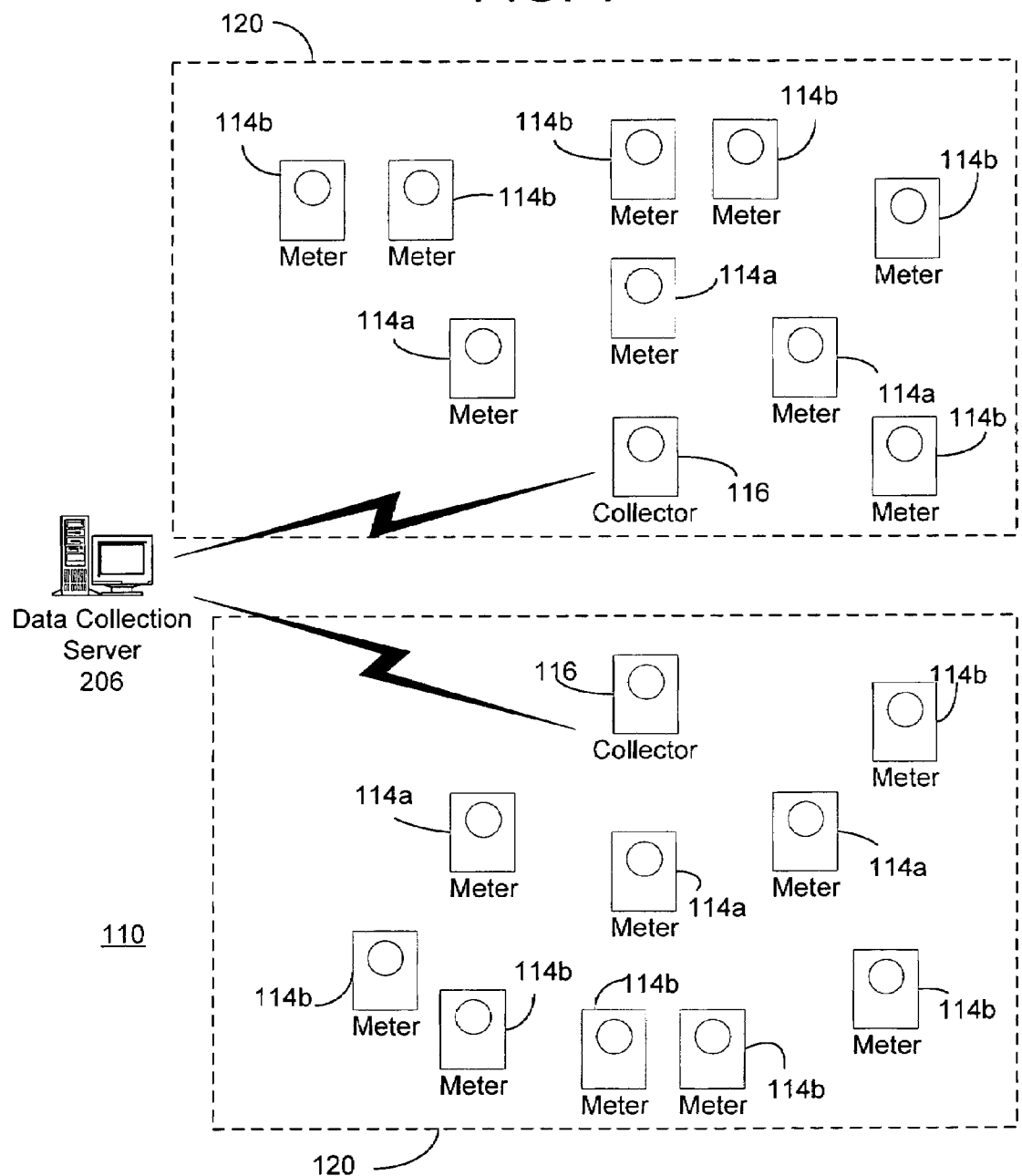
FIG. 1 is a diagram of a wireless system for collecting data from remote devices.

FIG. 1 provides a diagram of an exemplary metering system 110. System 110 comprises a plurality of meters 114, which are operable to sense and record usage of a service or commodity such as, for example, electricity, water, or gas. Meters 114 may be located at customer premises such as, for example, a home or place of business. Meters 114 comprise an antenna and are operable to transmit data, including service usage data, wirelessly. Meters 114 may be further operable to receive data wirelessly as well. In an illustrative embodiment, meters 114 may be, for example, a electrical meters manufactured by Elster Electricity, LLC.

System 110 further comprises collectors 116. Collectors 116 are also meters operable to detect and record usage of a service or commodity such as, for example, electricity, water, or gas. Collectors 116 comprise an antenna and are operable to send and receive data wirelessly. In particular, collectors 116 are operable to send data to and receive data from meters 114. In an illustrative embodiment, meters 114 may be, for example, an electrical meter manufactured by Elster Electricity, LLC.

A collector 116 and the meters 114 for which it is configured to receive meter data define a subnet/LAN 120 of system 110. As used herein, meters 114 and collectors 116 maybe considered as nodes in the subnet 120. For each subnet/LAN 120, data is collected at collector 116 and periodically transmitted to a data collection server 206. The data collection server 206 stores the data for analysis and preparation of bills. The data collection server 206 may be a specially programmed general purpose computing system and may communicate with collectors 116 wirelessly or via a wire line connection such as, for example, a dial-up telephone connection or fixed wire network.

Generally, collector 116 and meters 114 communicate with and amongst one another using any one of several robust wireless techniques such as, for example, frequency hopping spread spectrum (FHSS) and direct sequence spread spectrum (DSSS). As illustrated, meters 114a are "first level" meters that communicate with collector 116, whereas meters 114b are higher level meters that communicate with other meters in the network that forward information to the collector 116.

Figure 2:
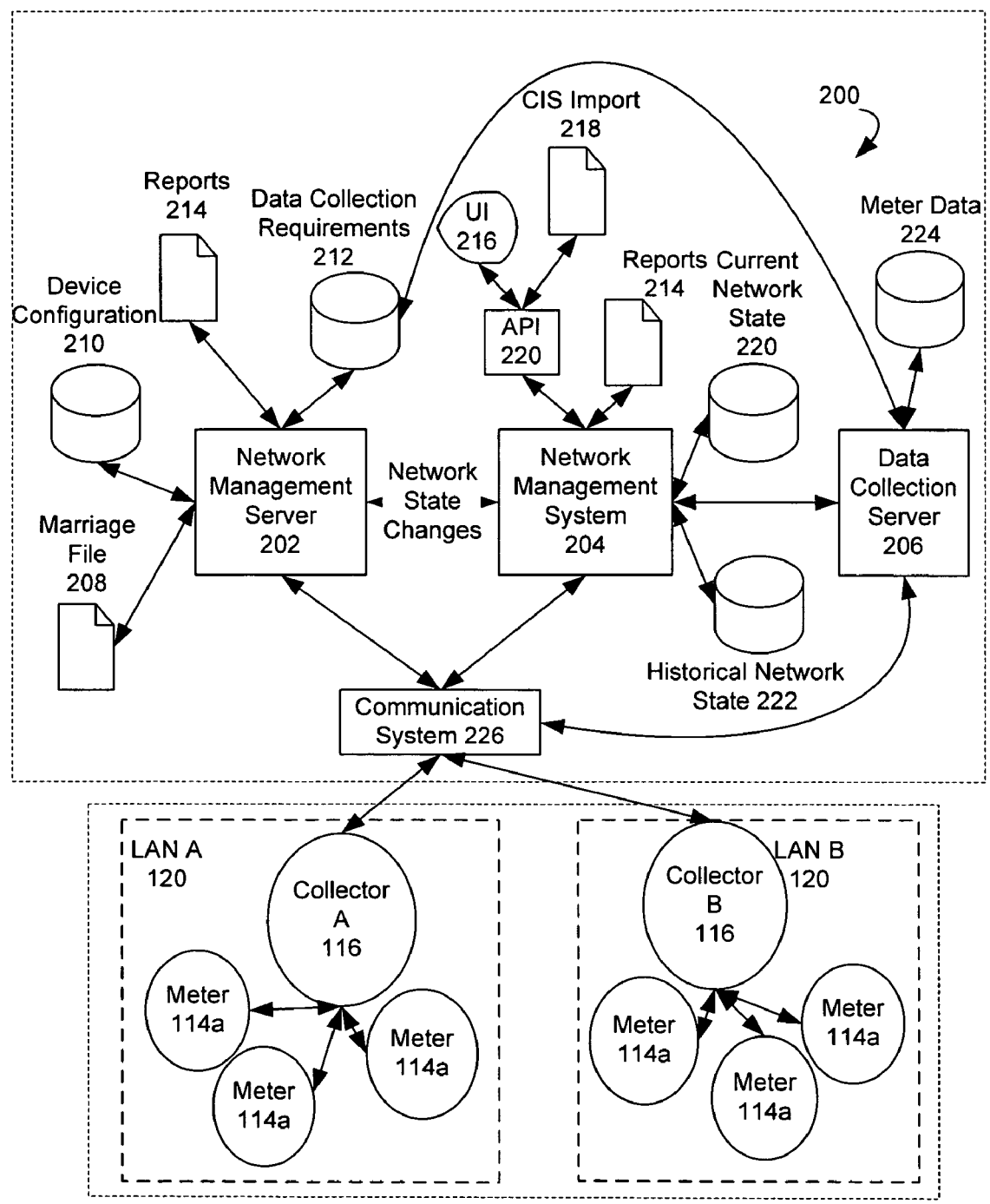
FIG. 2 expands upon the diagram of FIG. 1 and illustrates a system in which the present invention is embodied.

Referring now to FIG. 2, there is illustrated a system 200 in which the present invention may be embodied. The system 200 includes a network management server 202, a network management system (NMS) 204 and a data collection server 206 that together manage one or more subnets/LANs 120 and their constituent nodes. The NMS 204 tracks changes in network state, such as new nodes registering/unregistering with the system 200, node communication paths changing, etc. This information is collected for each subnet/LAN 120 and are detected and forwarded to the network management server 202 and data collection server 206.

In accordance with an aspect of the invention, communication between nodes and the system 200 is accomplished using the LAN ID, however it is preferable for customers to query and communicate with nodes using their own identifier. To this end, a marriage file 208 may be used to correlate a customer serial number, a manufacturer serial number and LAN ID for each node (e.g., meters 114a and collectors 116) in the subnet/LAN 120. A device configuration database 210 stores configuration information regarding the nodes. For example, in the metering system 110, the device configuration database may include data regarding time of use (TOU) switchpoints, etc. for the meters 114a and collectors 116 communicating to the system 200. A data collection requirements database 212 contains information regarding the data to be collected on a per node basis. For example, a user may specify that metering data such as load profile, demand, TOU, etc. is to be collected from particular meter(s) 114a. Reports 214 containing information on the network configuration may be automatically generated or in accordance with a user request.

The network management system (NMS) 204 maintains a database describing the current state of the global fixed network system (current network state 220) and a database describing the historical state of the system (historical network state 222). The current network state 220 contains data regarding current meter to collector assignments, etc. for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may be implemented in accordance with the present invention. In addition, the data collection requirements stored in the database 212 may be set via the user interface 216 or CIS 218.

The data collection server 206 collects data from the nodes (e.g., collectors 116) and stores the data in a database 224. The data includes metering information, such as energy consumption and may be used for billing purposes, etc. by a utility provider.

The network management server 202, network management system 204 and data collection server 206 communicate with the nodes in each subnet/LAN 120 via a communication system 226. The communication system 226 may be a Frequency Hopping Spread Spectrum radio network, a mesh network, a Wi-Fi (802.11) network, a Wi-Max (802.16) network, a land line (POTS) network, etc., or any combination of the above and enables the system 200 to communicate with the metering system 110.

Demand meters within the metering system 110 are typically put onto a billing schedule by the collector 116 and the system 200. The billing schedule may be set in accordance with a billing ID for a particular meter. The demand meters are read according to the schedule to determine a quantity of power consumed at a customer location. Reading of demand meters by the system 200 is often accomplished one of two ways: (1) contact the meter, read the demand data and reset the meter in a communication session, or (2) configure the meter self-read and reset, and read the demand data at a time after the reset (i.e., the meter operates as a so-called "auto-read" meter). A demand reset begins a new demand billing period.

In a system such as that shown in FIGS. 1 and 2, there are instances when only the meter's particular collector (e.g., collector A in LAN A) is aware of the meter's billing schedule. Further, the collector may not instruct the meter to perform a demand reset until 24-hours before the time when the reset is to occur (i.e., the collector instructs the meter to behave in accordance with option (2) above and the meter's billing schedule). This method of performing a demand reset/billing read advantageously eliminates the need for accurate time-keeping and calendaring in the meter, thus allowing the meter to be low cost. However, this may present problems if the meter cannot be contacted by the collector during the short period of time leading up to the demand reset. Problems in contacting the meter may be caused by a meter that has spontaneously changed collectors because of network interference, etc.

The present invention is directed to a system to overcome this problem, through an innovative use of a demand reset count (demand data sequence number) for each demand meter. When the billing data is collected from the meters, the system 200 expects that each meter has performed its auto-read with a demand reset. The system 200 has stored thereon the demand reset count for each meter. Because each meter 114a also tracks the demand reset count, the system 200 is able to compare an expected demand reset count to that received from the meter. If the expected remand reset count is one more than that received, then the system 200 is able to determine that the demand reset for the meter was missed.

Figure 3:
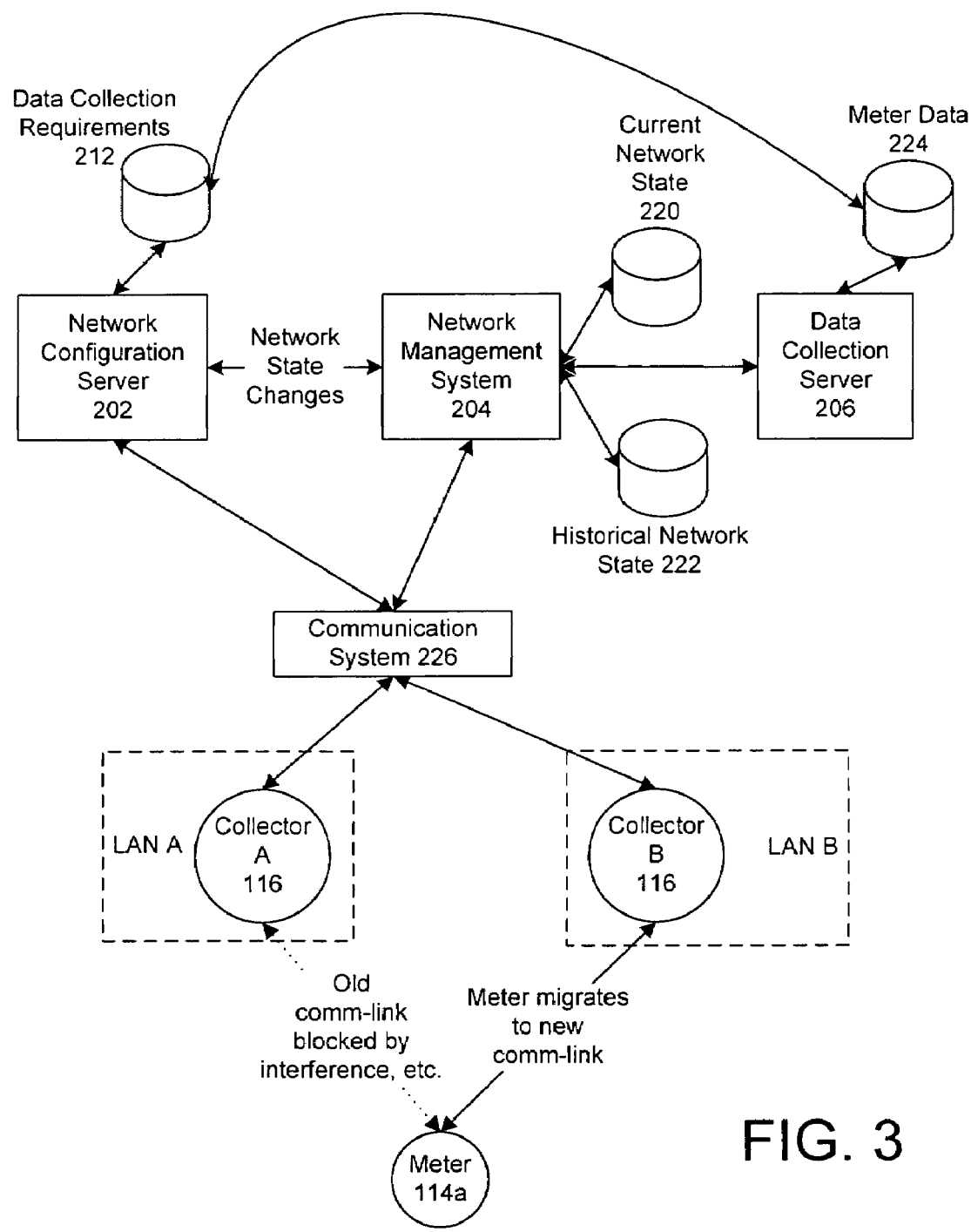
FIG. 3 illustrates a meter migrating from one collector to another.

For example, with reference to FIG. 3, if the meter 114a moves from collector A to collector B before the meter 114a is instructed to perform an auto-read, then collector B may not be aware of the billing date for the meter and/or the meter 114a will not perform an auto-read as expected. If a demand reset for the meter 114a was missed because the meter has changed collectors, then the present invention will instruct the meter's new collector (collector B) to synchronously reset the meter's demand registers and read the billing data from the meter 114a. This may be accomplished by using a system for managing spontaneously migrating nodes such as disclosed in co-pending application Ser. No. 10/949,682, filed herewith on Sep. 24, 2004, which is incorporated herein by reference in its entirety. If the operation fails, the system 200 will again contact the collector B to retry the operation until the meter data is successfully read.

While systems and methods have been described and illustrated with reference to specific embodiments, those skilled in the art will recognize that modification and variations may be made without departing from the principles described above and set forth in the following claims. Accordingly, reference should be made to the following claims as describing the scope of disclosed embodiments.

What is claimed:

1. A system for enforcing a demand reset in a meter operating within a wireless metering network, comprising:
   a network configuration server that determines a network state; and
   a data collection server that receives meter data and a counter from said meter,
   wherein when said data collection server receives said meter data and said counter, said system compares said counter to a second counter, and if said counter is less than said second counter, said network configuration server requests said meter to download said meter data and perform a demand reset.

2. The system of claim 1, further comprising a first collector associated with a first communication path from said meter to said system, and wherein if said counter is less than said second counter, said network configuration server instructs said first collector to contact said meter, download said meter data and perform said demand reset.

3. The system of claim 2, further comprising a second collector associated with a second communication path from said meter to said system, wherein it is determined by said network configuration server that said meter has migrated from said second communication path to said first communication path prior to instructing said first collector to contact said meter.

4. The system of claim 1, wherein said meter is configured as an auto-read meter and is instructed to perform said demand reset at a time in advance of reading said meter data.

5. The system of claim 1, wherein said meter and said system increment said counter and said second counter for each demand reset by said meter.

6. A method for enforcing a demand reset in a meter operating within a wireless metering network, comprising:
   receiving meter data and a counter from a meter at a data collection server;
   comparing said counter to a second counter; and
   if said counter is less than said second counter, requesting said meter to download said meter data and perform a demand reset.

7. The method of claim 6, further comprising:
   communicating said meter data to a first collector associated with a first communication path; and
   instructing said first collector to contact said meter to perform said billing read and said demand reset.

8. The system of claim 7, further comprising:
   determining that said meter has migrated from a second communication path having a second collector; and
   instructing said first collector to contact said meter after determining said meter has migrated from said second path.

9. The method of claim 6, further comprising:
   configuring said meter as an auto-read meter; and
   instructing said meter to perform said demand reset at a time in advance of reading said meter data.

10. The method of claim 9, said instructing said meter in accordance with a billing date.

11. The method of claim 6, further comprising:
    incrementing said counter and said second counter for each demand reset by said meter.

12. A computer-readable medium having computer-executable instructions for instructing a computing device to perform the steps of enforcing a demand reset in a meter operating within a wireless metering network, said steps comprising:

receiving meter data and a counter from a meter at a data collection server;

comparing said counter to a second counter; and if said counter is less than said second counter, requesting said meter to download said meter data and perform a demand reset.

13. The computer-readable medium of claim 6, further comprising instructions for performing the steps of:

communicating said meter data to a first collector associated with a first communication path; and instructing said first collector to contact said meter to perform said billing read and said demand reset.

14. The computer-readable medium of claim 13, further comprising instructions for performing the steps of:

determining that said meter has migrated from a second communication path having a second collector; and instructing said first collector to contact said meter after determining said meter has migrated from said second path.

15. The computer-readable medium of claim 12, further comprising instructions for performing the steps of:

configuring said meter as an auto-read meter; and instructing said meter to perform said demand reset at a time in advance of reading said meter data.

16. The computer-readable medium of claim 15, said instructing said meter in accordance with a billing date.

17. The computer-readable medium of claim 12, further comprising instructions for performing the steps of:

incrementing said counter and said second counter for each demand reset by said meter.

* * * * *